Nov. 17, 1970     W. M. HAMMOND, JR., ET AL     3,541,468
PULSED LASER ARRAY
Filed Jan. 3, 1966                    7 Sheets-Sheet 1
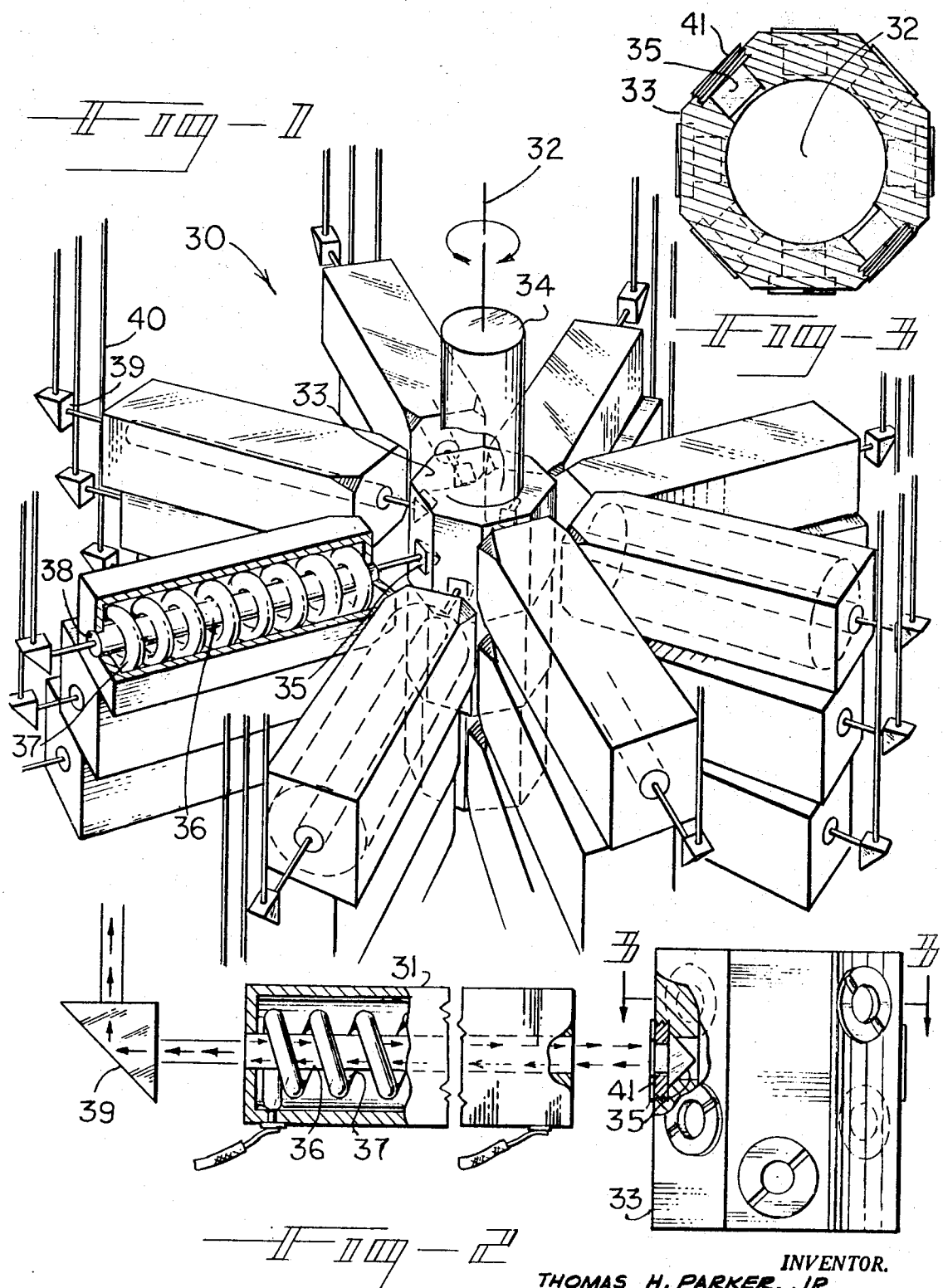
INVENTOR.
THOMAS H. PARKER, JR.
WARDLAW M. HAMMOND, JR.
BY
Julian C. Renfro
ATTOR.

INVENTOR
THOMAS H. PARKER, JR.
WARDLAW M. HAMMOND, JR.
ATTORNEY

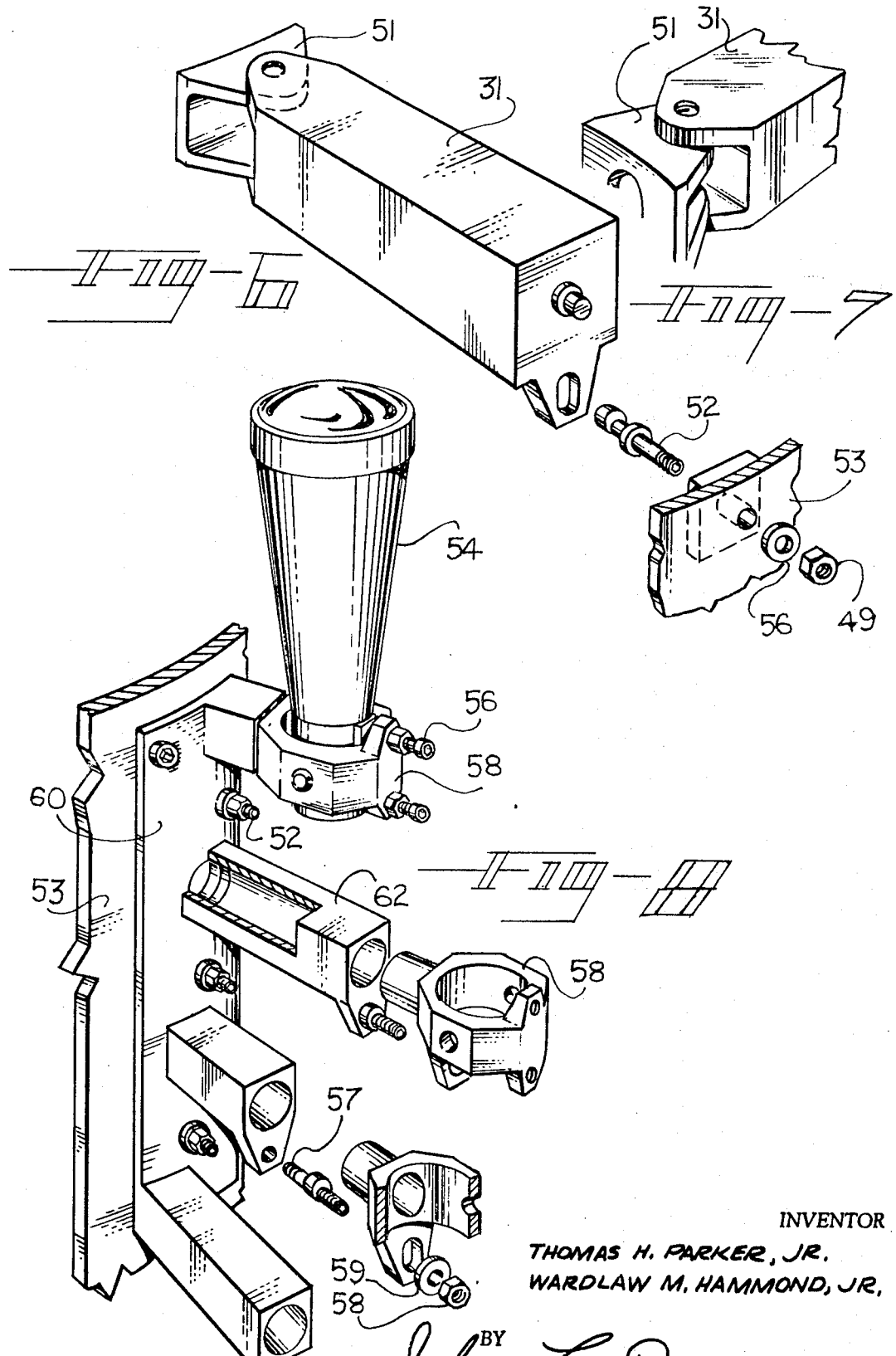

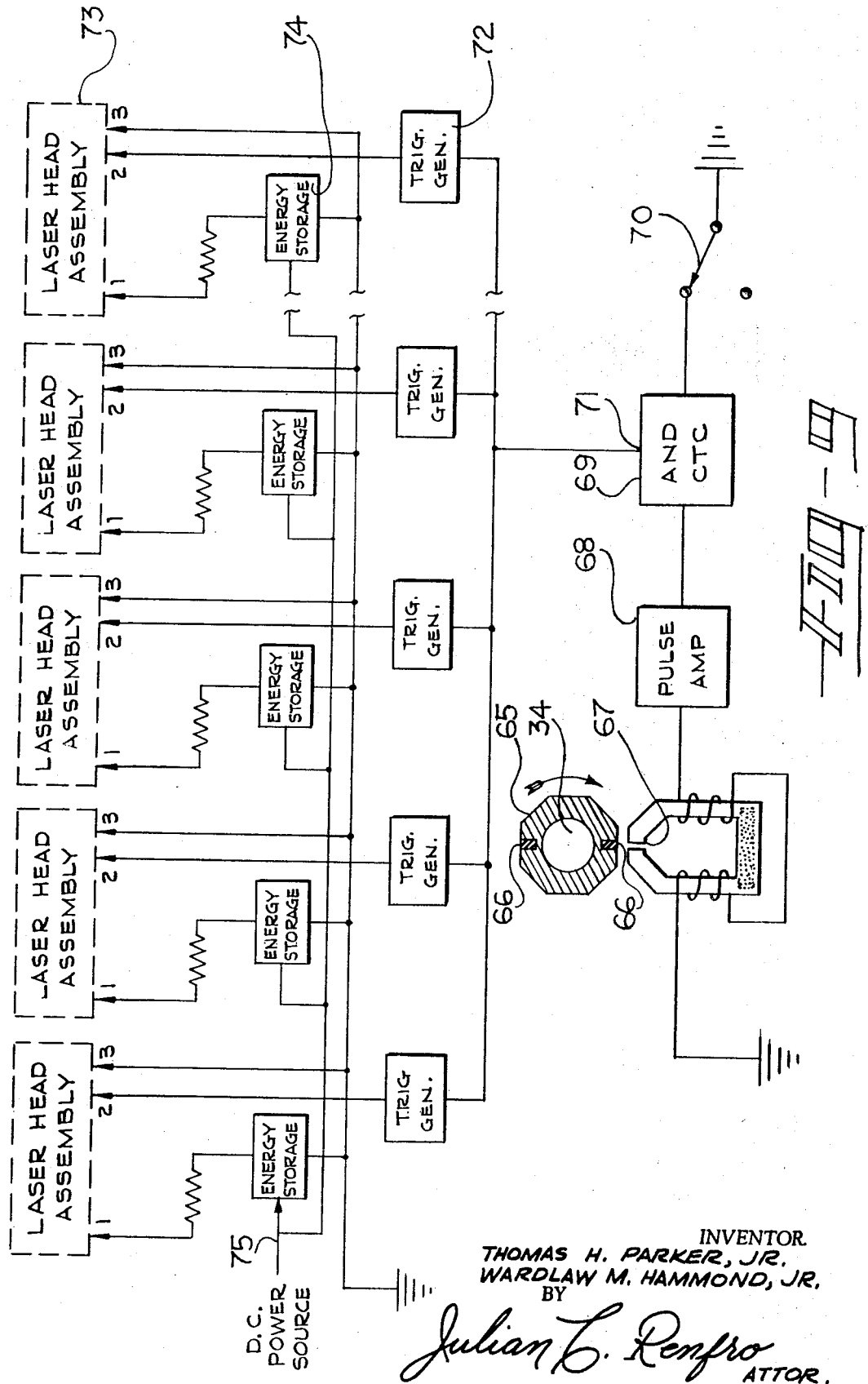

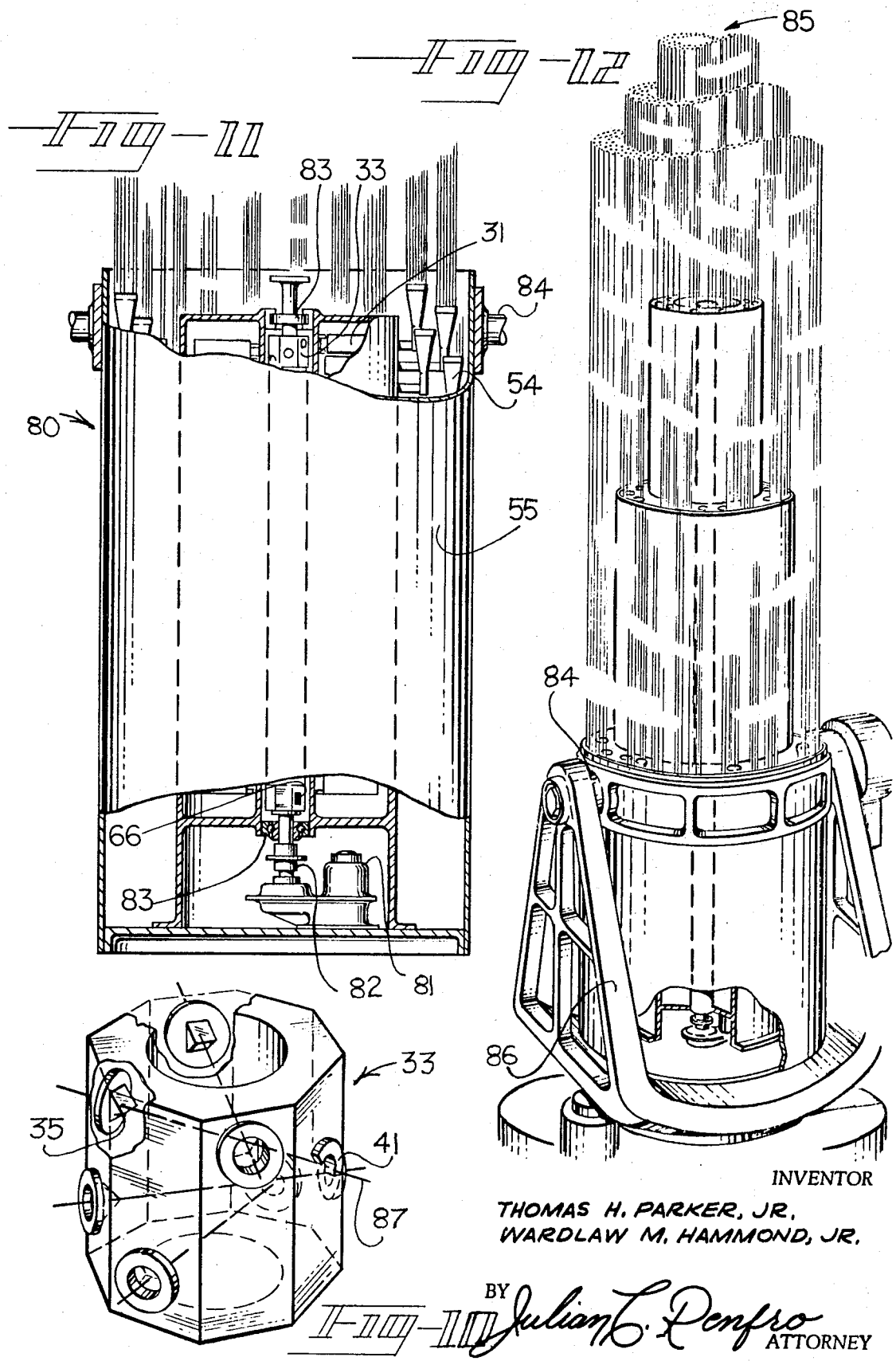

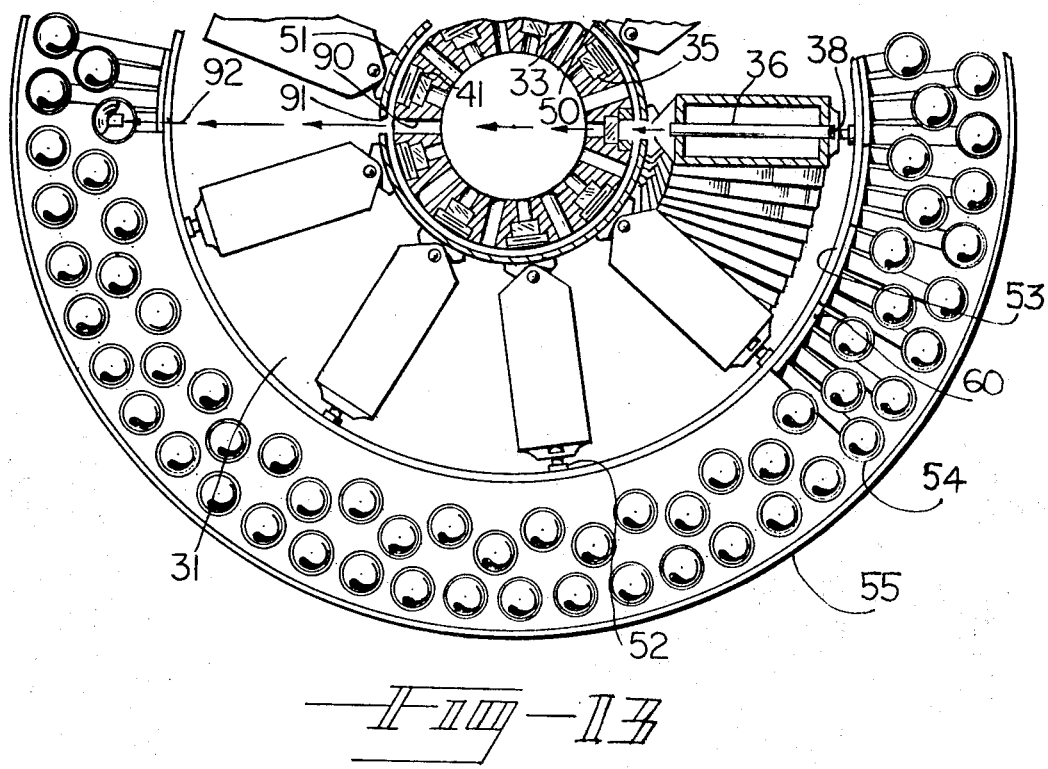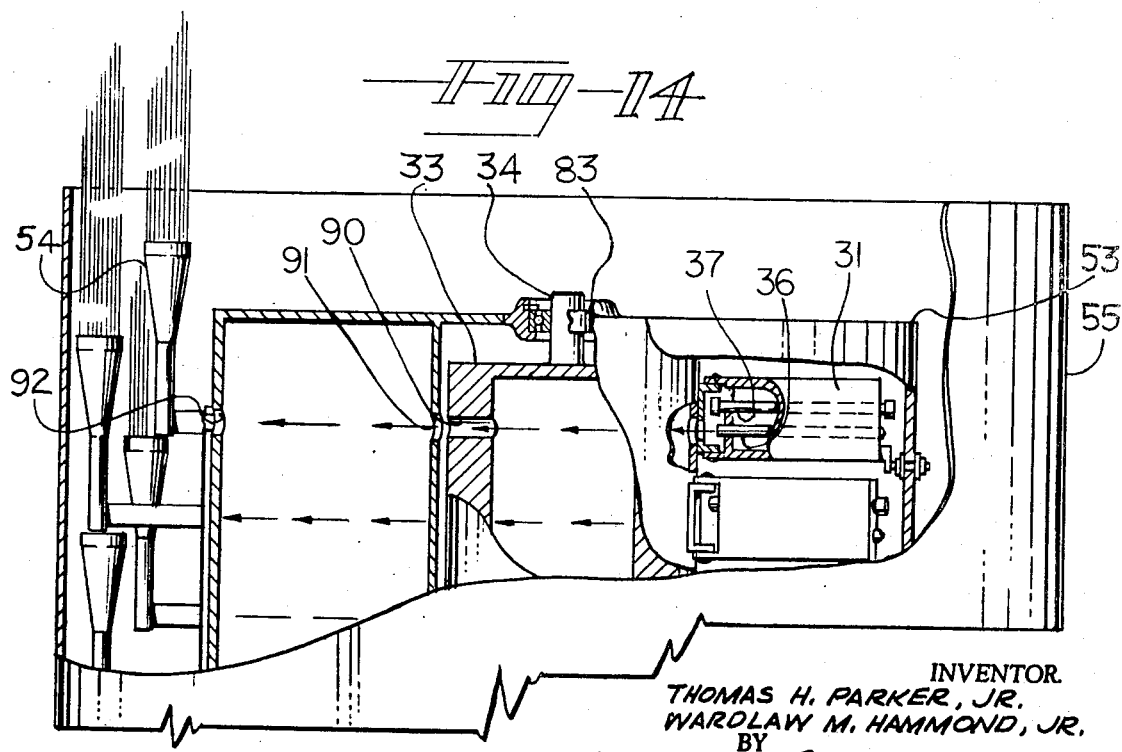

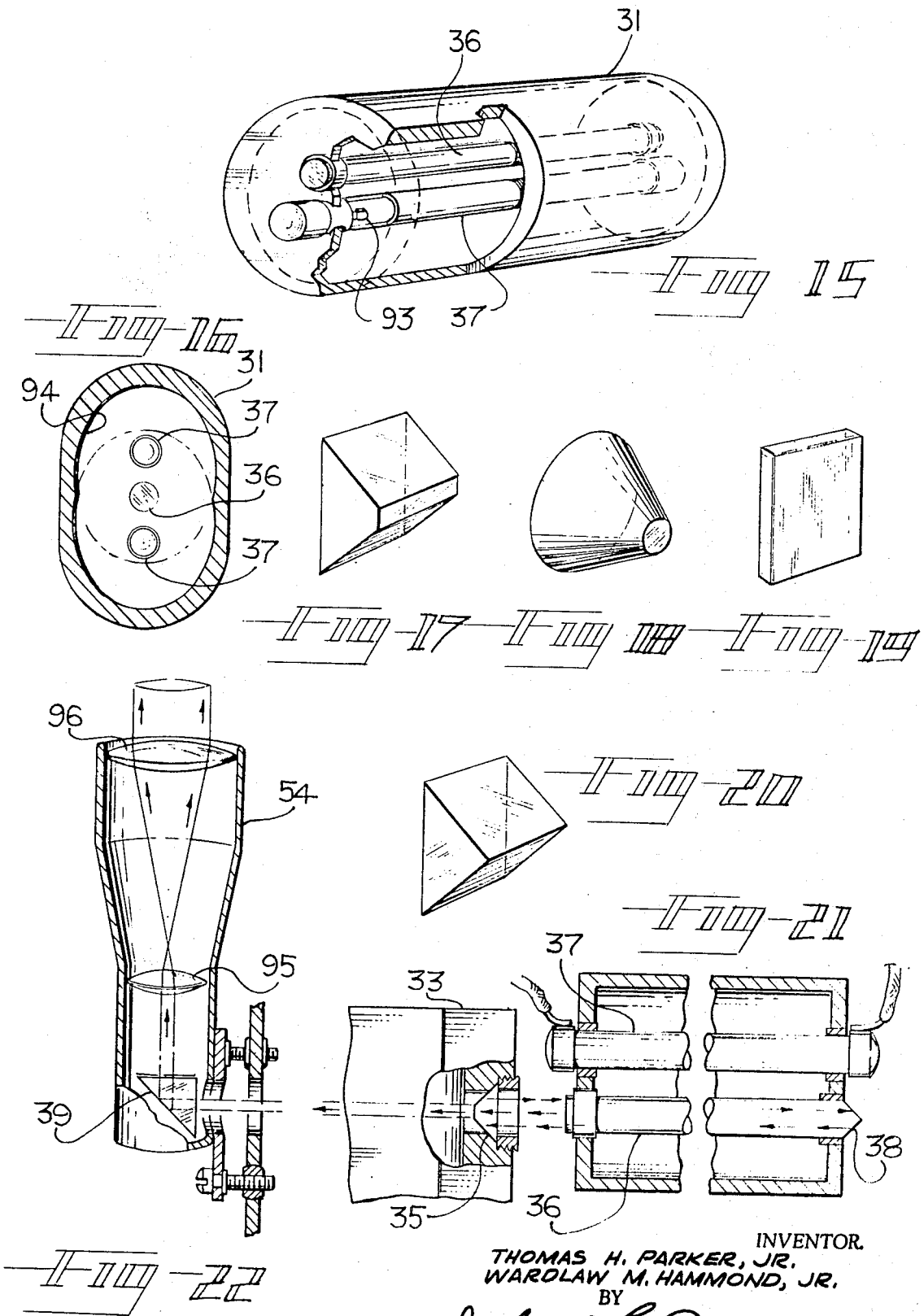

United States Patent Office 3,541,468
Patented Nov. 17, 1970

3,541,468
PULSED LASER ARRAY
Wardlaw M. Hammond, Jr., Winter Park, and Thomas H. Parker, Jr., Orlando, Fla., assignors to Martin-Marietta Corporation, Middle River, (Baltimore Co.), Maryland, a corporation of Maryland
Filed Jan. 3, 1966, Ser. No. 519,828
Int. Cl. H05s 3/02
U.S. Cl. 331—94.5                                    17 Claims

ABSTRACT OF THE DISCLOSURE

The present invention involves an array of laser units, radially disposed about a rotating member upon which a plurality of reflecting means are mounted. The reflecting means are arranged as said member rotates to transiently complete the optically resonant cavities of the laser units substantially simultaneously. A plurality of substantially parallel optical output means for the laser units are disposed about the outer periphery of the array, with this arrangement enabling one or more tiers of lasers to be simultaneously Q-switched without the output of any one laser interfering with the output of any other.

---

This invention relates to lasers and more particularly to a concept for obtaining very high powdered pulses of focused electromagnetic energy from an ensemble of lasers.

It has been suggested to use lasers for a wide diversity of activities ranging from communications over great distances to the drilling of very accurate holes in objects. Many such uses require a very large amount of focused electromagnetic energy, especially where it is desired to damage or destroy an object at a distance by focusing a large amount of energy on a small area. Physical damage or destruction is caused by the very rapid transfer of energy to the object which thereby produces a mechanical shock therein.

Lasers are now established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state. In the case of ruby as a laser material, three energy levels are utilized. The atomic systems are raised from the lower or ground level to the higher of the three levels by irradiation from a strong light source which need not be coherent but should preferably have a high concentration of energy in the absorbing wave-lengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level, a "population inversion" is said to exist.

The active material in the laser is made optically resonant by placing reflectors at either end thereof. Reflectors external to the laser material may be used but in the case of solid materials, such as a ruby rod, each end of the rod may be mirrored. The reflector on at least one end of the material is made partially transmissive so that there will be an escape from the resonant chamber.

A measure of the sharpness of the resonance is referred to as Q. Thus, when the system is made resonant, it is said to have a high Q, and when nonresonant, a low Q. In a resonant system, the optical resonant cavity of the laser will pick up some of the light that results from the fluorescence or the spontaneous transition with photon emission from the metastable state back to the ground state and resonant modes will be established which further stimulate emission to build up an electromagnetic wave. As the pumping means raises the population of atoms in the excited state to inversion, stimulated emission proceeds to deplete the population to below that of the spontaneous decay threshold. One method of exceeding the threshold of population inversion is to interrupt the resonant cavity until pumping has greatly exceeded inversion and then suddenly restore the Q or resonant cavity. If stimulated emission is retarded in this way until a very high level of inversion is reached a narrow pulse of high power can be generated. This method is referred to as Q switching or spoiling. Q-switching may be accomplished in many ways but the present invention is primarily concerned with one end of the resonant cavity being positioned on a rotating member so that it completes the cavity as the member rotates and the reflecting means passes one end of the laser material. The portion of the cavity at the other end of the laser remains fixed.

Turning now to the problem of increasing the output of lasers, it has been determined to be impractical to fabricate individual laser sources of large dimensions to achieve very high energy outputs due to internal losses which increase rapidly as the laser active material increases in size and since the optical components would be damaged by large lasers. Also, the construction of a large portion of active laser material is not feasible for many materials. For instance, a ruby crystal is generally grown stain-free in a furnace and it is difficult to grow and anneal very large crystals optically perfect enough for laser applications. In view of these problems, simultaneously combining the outputs of a group of lasers appears to offer the best means for obtaining very high powered energy pulses from lasers.

The present invention advantageously combines an ensemble of lasers to produce a very high powered pulse of electromagnetic energy resulting from the simultaneous release of energy from each laser. The lasers may be located around a rotated member and substantially simultaneously Q-switched by reflecting elements disposed on the rotating member in a manner to complete the resonant cavity of each laser simultaneously as the rotating member passes a point of substantial alignment of the reflected elements with their respective lasers. The pumping means for each laser may also be controlled by the rotating member reaching a predetermined point which thereby activates the triggering means. The invention preferably has means to direct and focus the output of the lasers.

Other objects, features, and advantages of this invention will be apparent from a study of the written description and the drawing in which:

FIG. 1 shows a perspective view of a portion of the laser array of the preferred embodiment;
FIG. 2 is a side elevation view of a portion of FIG. 1;
FIG. 3 is a top view of a portion of the rotating reflector assembly;
FIG. 4 is a top view of the preferred embodiment;
FIG. 5 shows a cutaway side view including the optic means;
FIG. 6 is an exploded view of the laser mounting assembly;
FIG. 7 is a view of the hinge of FIG. 6;
FIG. 8 is an exploded view of the optic mounting assembly;

FIG. 9 is a block diagram of the laser trigger synchronization means;

FIG. 10 is a perspective view of the roating reflector assembly;

FIG. 11 is a cutaway side view of a complete laser array assembly;

FIG. 12 shows an embodiment of FIG. 12 with mounting yoke and additional stages;

FIG. 13 is a top view of another embodiment of the present invention;

FIG. 14 is a cutaway side view of the embodiment of FIG. 13;

FIG. 15 is an alternate laser embodiment;

FIG. 16 is still another laser embodiment;

FIG. 17 is a porro prism reflector element;

FIG. 18 is a truncated cone reflector element;

FIG. 19 is a flat reflector element;

FIG. 20 is a roof or porro prism reflector element;

FIG. 21 shows a laser and accompanying reflector element;

FIG. 22 is a cutaway of one of the telescopes of the present invention.

Figure 4:
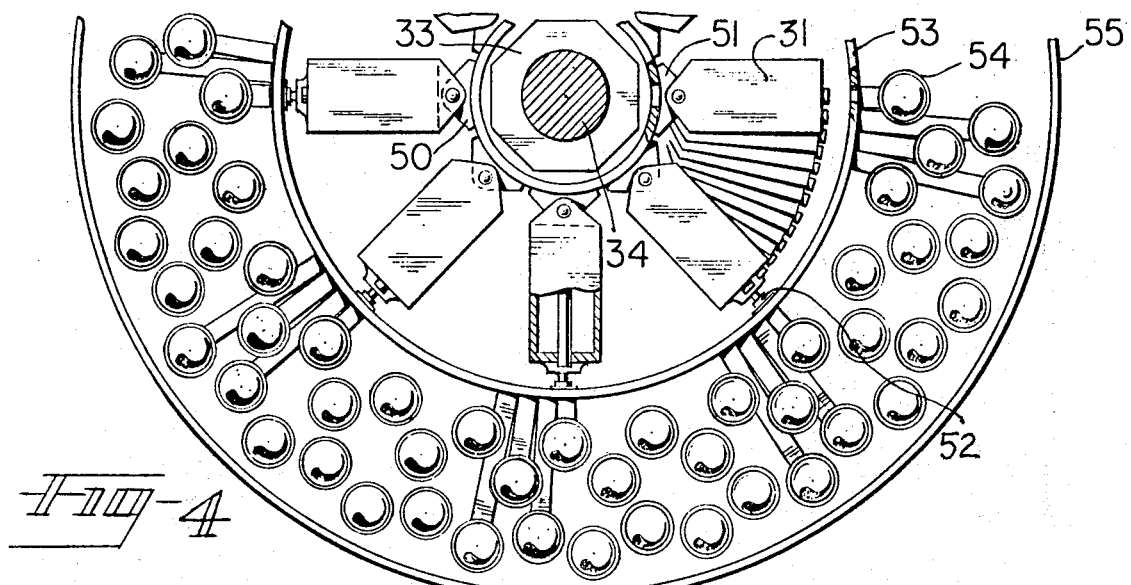

Referring to FIGS. 1–11, a preferred embodiment of the present invention is illustrated in which the laser array is indicated at 30 of FIG. 1 with a plurality of laser housings 31 arranged in a helical fashion around a central axis 32. The rotating reflector assembly 33 may be rotated by a drive shaft 34 and has reflector elements 35 placed thereon. Each laser housing 31 contains a unit of laser material 36 such as a ruby crystal or rod, and a pumping means 37, illustrated as a flash tube such as a xenon arc lamp. Each laser may have a partially reflective surface 38 at one end to form a portion of an optical resonant cavity. Reflector elements 35 are connected to the rotating reflector assembly 33 and are adapted to form the remainder of the resonant cavity when the rotating reflector assembly 33 is in a position where an element 35 is aligned with the end of each laser material 36. In this particular embodiment, each reflector element 35 comes into alignment with a laser material 36 during each 180° of rotation but the lasers can be arranged for other alignments without departing from the scope of the invention. Prisms 39 are shown in FIG. 1 for directing the laser beams 40 but will normally be an integral part of an optical means for directing and focusing each laser beam. This prism may be made of glass, quartz or the like.

As can be seen in FIGS. 2 and 3, the rotating reflector assembly 33 may have threaded plugs 41 which are screwed into the assembly 33 for holding reflector elements 35 in place. Threaded plugs 41 have holes through their center axes so as not to interfere with the laser operation.

Referring specifically to FIG. 1, it can be seen that laser units 31 are located around the rotating reflector assembly 33 in a helical fashion with the first four units being stepped off for one half of a circle and the next four units starting over to complete the circle so that each laser unit 31 will be directly opposite a second unit around reflector assembly 33. The next tier of lasers will follow the same pattern except that each lower tier is slightly rotated around central axis 32 in relation to the preceding tier. Each tier of lasers 31, for instance may be rotated by an angle 3.75 degrees from the preceded tier of lasers. Laser housings 31 also form two continuous stepped helices around central axis 32, each starting at the same level but 180° of rotation around axis 32. In other words the starting laser housing of one helix will be directly opposite and across the rotating reflector assembly 33 from the starting laser housing of the other helix.

At this point it can be seen that the present invention may be adapted to simultaneously Q switch a group of lasers by the rotation of rotating reflector assembly 33, thereby causing each reflecting element 35 to be first out of alignment with laser material 36 and thus creating a low Q situation and then coming into alignment with a laser to create a high Q. All such lasers must be aligned so as to come into alignment with their reflector elements 35 substantially simultaneously. Simultaneous pumping of the lasers must also be accomplished at the proper time prior to the laser output pulse.

Due to the short duration of the Q-switched laser pulse it is necessary that each pulse be generated within $3 \times 10^{-8}$ seconds of the others. With a rotating reflector assembly speed of 20,000 r.p.m. this would represent an optical alignment precision of 10 seconds of arc for each laser. This may readily be achieved in the present invention.

Figure 5:
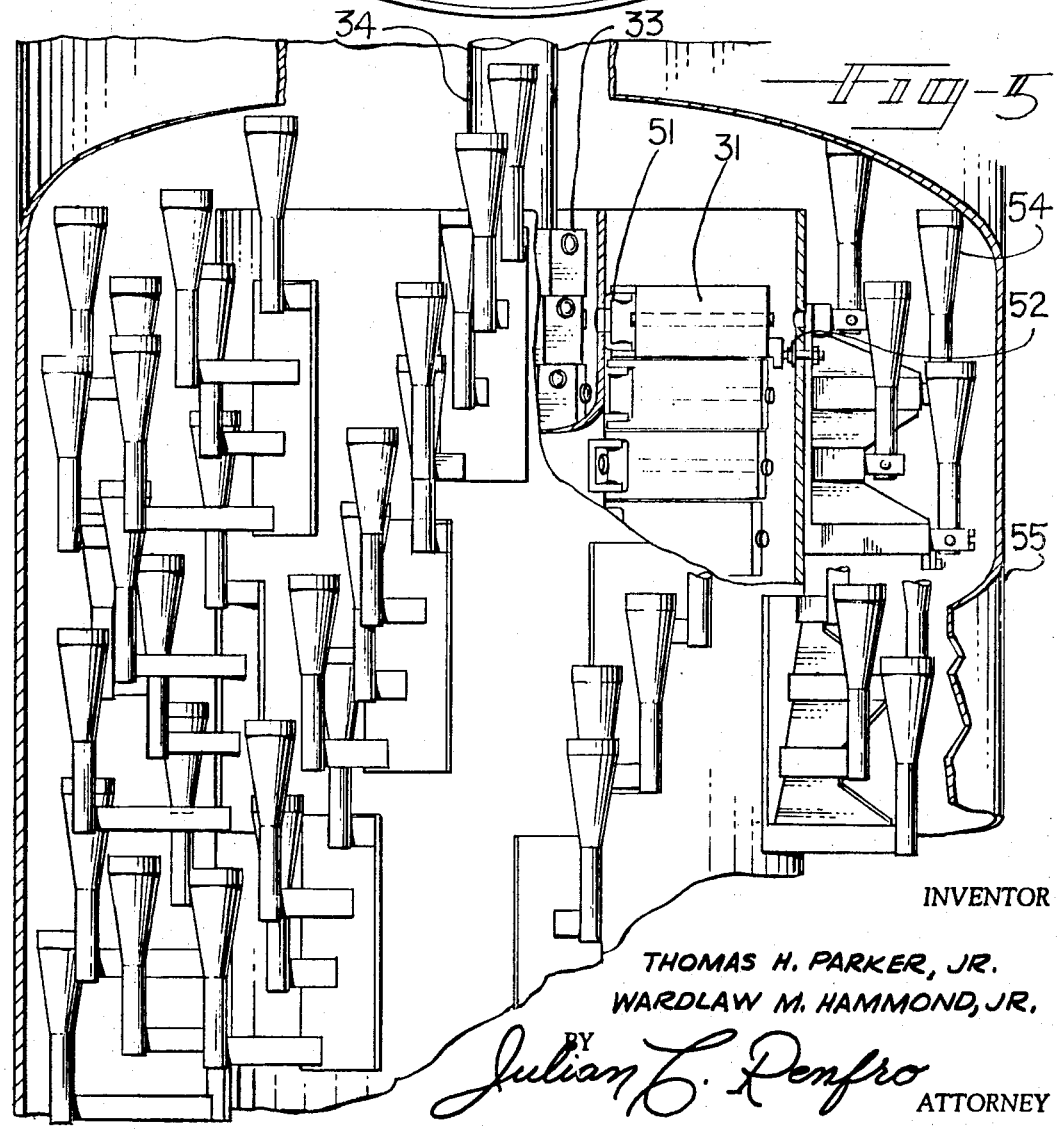

Referring to FIGS. 4 and 5 a top and side view of the laser array is shown with a centrally located drive shaft 34 connected to the rotating reflector assembly 33. A cylindrical wall 50 has swivel brackets 51 located on its outer surface for mounting the laser housing 31. Each laser housing 31 with its accompanying swivel bracket 51 is preferably displaced at an angle of 3.75 degrees from the next laser housing in a stepped arrangement around the cylindrical wall 50. The lasers are stepped for 45° or 12 lasers spaced at 3.75 degrees each. The stepping arrangement then starts over each 45° until 180° or a hemicylinder is completed. The remaining 180° or hemicylinder is identical to the first so that each laser will have a laser directly opposite it on the other side of the reflector assembly 33. Cylindrical wall 50 of course has holes located therein at a point next to the end of the laser material 36 of each laser. Laser housing 31 may be axially aligned and locked in place by a precision eccentric 52, which extends through a cylindrical wall 53. Wall 53 has holes therein located at the end of the laser material 36 so that the laser beam may escape.

Optical telescopes 54 are used to direct and focus the laser output in a narrow beam and are connected to the outer surface of the cylindrical wall 53. The laser beams are directed in a common direction so that the beams may converge. One optical telescope 54 is associated with each laser 31 and is connected to the wall 53 at the hole therein associated with the particular laser. An outside cylindrical wall 55 encloses the entire apparatus.

FIGS. 6 and 7 show a preferred way of mounting each laser housing 31 which is connected to a swivel bracket 51, and has an eccentric 52 for making precise horizontal adjustments. This eccentric is secured to the cylindrical wall 53 by a nut 49 and a washer 56, and has a wrench head fitting for making precise adjustments of the laser housing 31 by pivoting the housing on swivel bracket 51.

FIG. 8 is an exploded view of the optical focusing subassembly 60 whereby optical telescopes 54 may be adjusted in two directions of freedom. Telescope toggle adjustment screw 56 adjusts the telescope 54 in one plane while precision eccentric 57 adjusts it in another by rotating the telescope gimbal mount 58. Eccentrics 57 are locked in place by a nut 48 and a washer 59. Optical focusing subassembly 60 is secured to the cylindrical wall 53 by bolts 61. This subassembly 60 has hollowed extensions 62 for mounting telescope gimbal mount 58 which is held by eccentric 57 and its associated nut 48 and washer 59. As can be readily seen, once the telescopes and their mounting assembly are assembled, the telescope can be adjusted as desired.

Referring to FIG. 9, the block diagram of the laser pump energy source and triggering means is shown. Drive shaft 34 (FIGS. 1, 4, 5 and 9) has located thereon a timing element 65 which may have two permanent magnets 66 embedded therein. A magnetic or variable-reluctance pickup 67 generates a pulse in response to the variation in reluctance caused by the magnets 66 as they rotate with the drive shaft 34. The pulse generated by the pickup 67 is fed to a pulse amplifier 68 where it is amplified prior to being fed to a coincidence triggering circuit 69 which may be an "AND" gating circuit. When the switch 70 is in a closed position with respect to circuit 69 and a pulse is fed into the circuit from the pulse amplifier 68, a pulse will be generated at output 71 which will be fed to a triggering generator 72 for each laser of the present apparatus. Each triggering generator 72 serves to increase the voltage of the input pulse, which is then fed into each laser head assembly 73. The energy storage means 74 may be a capacitor storage bank which when charged maintains a high voltage differential between inputs 1 and 3 of the laser head assemblies 73. The inputs 1 and 3 are connected to the electrodes of the pumping means or flash tubes 37 (FIGS. 1 and 2) of each laser. A triggering voltage at input 2 of each laser head assembly acts to ionize a gas, such as xenon, in the flash tube. The ionization of the gas within the tube may be accomplished by a wire wrapping around the flash tube, with the input 2 of the laser head assembly connected to one end and the other end connected to the appropriate flash tube electrode. Ionization of the gas within the flash tube increases the conductivity of the gas and causes a breakdown between electrodes 1 and 3. This breakdown creates the flash used for pumping the laser material 36 (FIGS. 1 and 2). As can be seen all the pumping means 37 can be triggered at the same time and at a predetermined point of rotation of drive shaft 34 by locating magnets 66 in the desired position. The energy source 75 is used to charge the energy storage means 74.

In operation, the drive shaft 34 is driven by an electric motor typically at a speed of 15,000–20,000 r.p.m. Switch 70 may then be closed, whereupon the next pulse generated by magnets 66 passing the magnetic pickup 67 will cause a pulse to be produced which will activate all of the laser pumping means 37 (FIGS. 1 and 2) as already described. Each pumping means 37 will pump its respective laser material 36 to raise the energy level to a sufficient population of active atoms in the laser material 36 in excess of the number required for inversion. When the population of atoms in the excited state has approached an optimum, the reflector assembly 33 (FIGS. 1 and 2) will preferably be timed to reach a point in rotation where all of the reflector elements 35 come into alignment with the laser rods 36 substantially simultaneously, creating a high Q therein which produces the laser action in the lasers. A pulse is produced at the partially reflective surface 38 which is fed to prism 39 located inside a telescope 54 (FIGS. 4 and 5). Telescopes 54 then focus all the laser pulses on a single target where the combined energy can be used to produce the desired results.

FIG. 10 shows more clearly the rotating reflector assembly 33 with threaded plugs 41, and reflector elements 35. The axes of threaded plugs 41 indicate how each reflector element 35 is directly oppoosite a similar reflector element 35.

In FIG. 11 a cutaway of a complete example of the laser array of the present invention is shown at 80 with the drive motor 81 which drives the drive shaft 34 through coupling 82. The drive shaft 34 may be supported at both ends by bearings 83 and has timing elements 66 just above the lower bearing 83. The rotating reflector assembly 33 can be seen at the top of the figure along with laser housings 31, telescopes 54, and outer cylindrical cover 55. The system may be angularly oriented by placing the trunnions 84 in a suitable mounting yoke.

To provide greater energy output than is available from the laser array 80, stages of additional laser arrays may be added or stacked as shown in FIG. 12. The stacked laser array 85 is supported by trunnions 84 in yoke 86 which supports the array in such a manner that the array 85 may be rotated on the trunnions 84 and the yoke 86 may be rotated on its base. When the arrays are stacked in the manner shown, they may utilize a single drive motor, drive shaft and trigger synchronizing means.

FIGS. 13 and 14 show a second embodiment of the present invention which has the same laser housing 31 movably attached to the cylindrical wall 50 by swivel brackets 51. Laser housings 31 have the laser materials 36 located therein and each has a precision eccentric 52 to align the laser material. In this embodiment, however, reflective end 38 of the laser material 36 is no longer the partially reflective end of the resonant cavity. Reflective elements 35 held to the rotating reflector assembly 33 by threaded plugs 41 are now the partially reflective surfaces. The system operates in the same manner as the embodiment of FIGS. 1–11 except that the reflective elements 35 will now let the laser beam escape radially inwardly from the cavity. This requires that a passageway be provided on the opposite side of the rotating reflector assembly 33 for the beams to pass. Hence, passageways 90 are provided in the rotating reflector assembly 33 and holes 91 and 92 are located in the cylindrical walls 50 and 53 respectively. The laser beams pass through the reflective elements 35, through the center of the rotating reflector assembly 33 and into passageways 90, holes 91 and 92, and then is redirected in a common direction as desired. As can now be seen, the laser housings 31 will have to be aligned in a slightly different position from the last embodiment so that the laser material 36 of each laser will not be directly opposite a second laser material 36. Telescopes 54 will also have to be aligned with each laser accordingly. Also drive shaft 4 (FIG. 14) cannot run through the rotating reflector assembly 33 as it could in the prior embodiment.

In FIG. 14 the drive shaft 4 may be seen supported by the support bearings 83 and the pumping means 37 is illustrated as a straight flash tube. Outer cylindrical wall 55 surrounds the apparatus. The synchronizing and triggering means are the same as that already described in FIG. 9.

FIG. 15 is an alternate laser embodiment that may be used in which the housing 31 is cylindrically shaped and has a laser material 36 and a pumping means 37 shown as a straight flash tube in which one of the electrodes 93 may be seen.

FIG. 16 shows yet another laser embodiment with the pumping means utilizing two flash tubes 37, one on either side of the laser material 36, and with reflectors 94 located inside the housing 31 to direct the energy of flash tubes 37 into the laser material 36.

FIGS. 17–20 show some of the different types of reflector elements that may be utilized on the rotating reflector assembly and may also be used for the remaining portion of the resonant cavity. FIG. 17 is a porro prism type reflector element with a flattened top, FIG. 18 a truncated cone reflector element, FIG. 19 a flat surface reflector element, and FIG. 20 a roof or porro prism reflector element. A porro prism type reflector such as shown in FIG. 20 is preferably used for reflective elements 35 because alignment is much less critical than for instance in a flat surface reflector element.

FIG. 21 illustrates a portion of the embodiment of FIGS. 13–14 with a laser material 36, flash tube 37, rotating reflector assembly 33, and a reflector element 35, illustrated as a roof or porro prism type. The reflective end 38 is shown as a roof prism reflector formed as a part of the laser crystal 36. FIG. 22 shows a cutaway of a telescope 54 so that the optics can be seen with directing prism 39 and lens 95 and 96 for collimating the laser beam.

From the foregoing description it will be clear that a device has been provided for obtaining very high powered pulses of focused electromagnetic energy from an array of lasers. The circuit as described has a wide range of applications but it is to be understood that other variations are contemplated as being within the spirit of the invention. For instance the present invention could be operated without Q-switching by initially aligning the rotating member so that all of the reflector elements are in alignment with their respective laser units and then physically clamping the rotating member in place.

This invention is not to be construed as limited to the particular forms disclosed therein, since these are to be regarded as illustrative rather than restrictive.

We claim:
1. An apparatus for obtaining very high powered pulses of focused electromagnetic energy from an ensemble of lasers comprising in combination:
   (a) a rotating member capable of rotating on an axis;
   (b) pulse type lasers disposed around said rotating member, each laser including a unit of laser material and pumping means for the generation of a population inversion in said laser material;
   (c) reflecting means for forming in conjunction with each laser a portion of a resonant cavity;
   (d) synchronizing means coupling said rotating member with said pumping means for simultaneously triggering said pumping means at predetermined positions of rotation of said rotating members;
   (e) reflector elements disposed on said rotating member for completing the resonant cavity of each said laser as said rotating member rotates;
   (f) said rotating member rotating through positions in which said reflector elements simultaneously complete the optical resonant cavities of said lasers whereby said lasers are simultaneously Q-switched; and
   (g) a plurality of substantially parallel optical output means for said lasers, disposed about the outer periphery of the ensemble, for providing a high energy output in a common direction.

2. The apparatus according to claim 1 in which said reflecting means is only partially reflective so that energy may escape from said resonant cavity into said optical means.

3. The apparatus according to claim 2 in which said lasers are arranged around said rotating member in stepped helices.

4. The apparatus according to claim 3 in which each laser of one helix of said lasers is opposite a laser of another helix of said lasers.

5. The apparatus according to claim 4 in which said output means includes a telescope for each said laser.

6. The apparatus according to claim 5 in which said reflector elements are porro prisms.

7. The apparatus according to claim 6 in which said reflecting means are an integral part of said unit of laser material.

8. The apparatus according to claim 7 in which said reflecting means are porro prisms.

9. The apparatus according to claim 8 including mounting means for mounting said lasers around said rotating member.

10. The apparatus according to claim 9 including laser alignment means whereby precision adjustments may be made to the position of said lasers.

11. The apparatus according to claim 10 including telescope alignment means for the precision adjustment of said telescopes.

12. An apparatus for obtaining very high powered pulses of focused electromagnetic energy from an ensemble of Q-switched lasers comprising in combination:
   (a) a rotating member capable of rotating on an axis;
   (b) lasers disposed around said rotating member, each laser including a unit of laser material and pumping means for the generation of a population inversion in said laser material;
   (c) reflecting means for forming in conjunction with each laser a portion of a resonant cavity;
   (d) synchronizing means coupling said rotating member with said pumping means at predetermined positions of rotation of said rotating member;
   (e) reflector elements disposed on said rotating member for completing the resonant cavities of said lasers substantially simultaneously, said reflector elements being only partially reflective so that energy may escape from said resonant cavity;
   (f) optical means on each laser at a location away from the axis of rotation of said rotating member for directing and focusing the output beams of said lasers;
   (g) passageway means in said rotating member whereby energy escaping said resonant cavities through said reflector elements can pass through said rotating member into said optical means;
   (h) whereby as said rotating member rotates through positions in which said reflector elements simultaneously complete the optical resonant cavities of said lasers, said lasers are simultaneously Q-switched.

13. The apparatus according to claim 12 in which said reflecting means are porro prisms, each said reflecting means being an integral part of a unit laser material.

14. An arrangement for simultaneously Q-switching a plurality of laser units and providing an output therefrom in a common direction, said arrangement comprising a radial array of laser units, each laser unit comprising a portion of an optically resonant cavity capable of being transiently completed, in which laser material is disposed, pumping means for bringing about population inversion in such laser material at a proper time before the completion of said resonant cavities is brought about, a rotational member disposed in the center of said array of laser units, upon which member a plurality of reflector elements are disposed, said reflector elements being arranged to transiently complete said optically resonant cavities substantially simultaneously, and a plurality of optical output means on the outer portion of said array of laser units enabling such simultaneous output from said laser units to be delivered in a common direction.

15. The arrangement as defined in claim 14 in which each of said laser units is disposed in a slightly different plane than the immediately adjacent laser units.

16. The arrangement as defined in claim 14 in which said laser units are disposed in a helical array.

17. The arrangement as defined in claim 14 in which said laser units are arrayed in at least two interwound helices.

References Cited
UNITED STATES PATENTS

| 3,107,296 | 10/1963 | Hine | 350—96 |
| 3,310,753 | 3/1967 | Burkhalter | 331—94.5 |

RONALD L. WIBERT, Primary Examiner

C. CLARK, Assistant Examiner